March 1, 1938. M. POCIECHA 2,110,071
LAWN MOWER
Filed Oct. 13, 1936 2 Sheets-Sheet 1
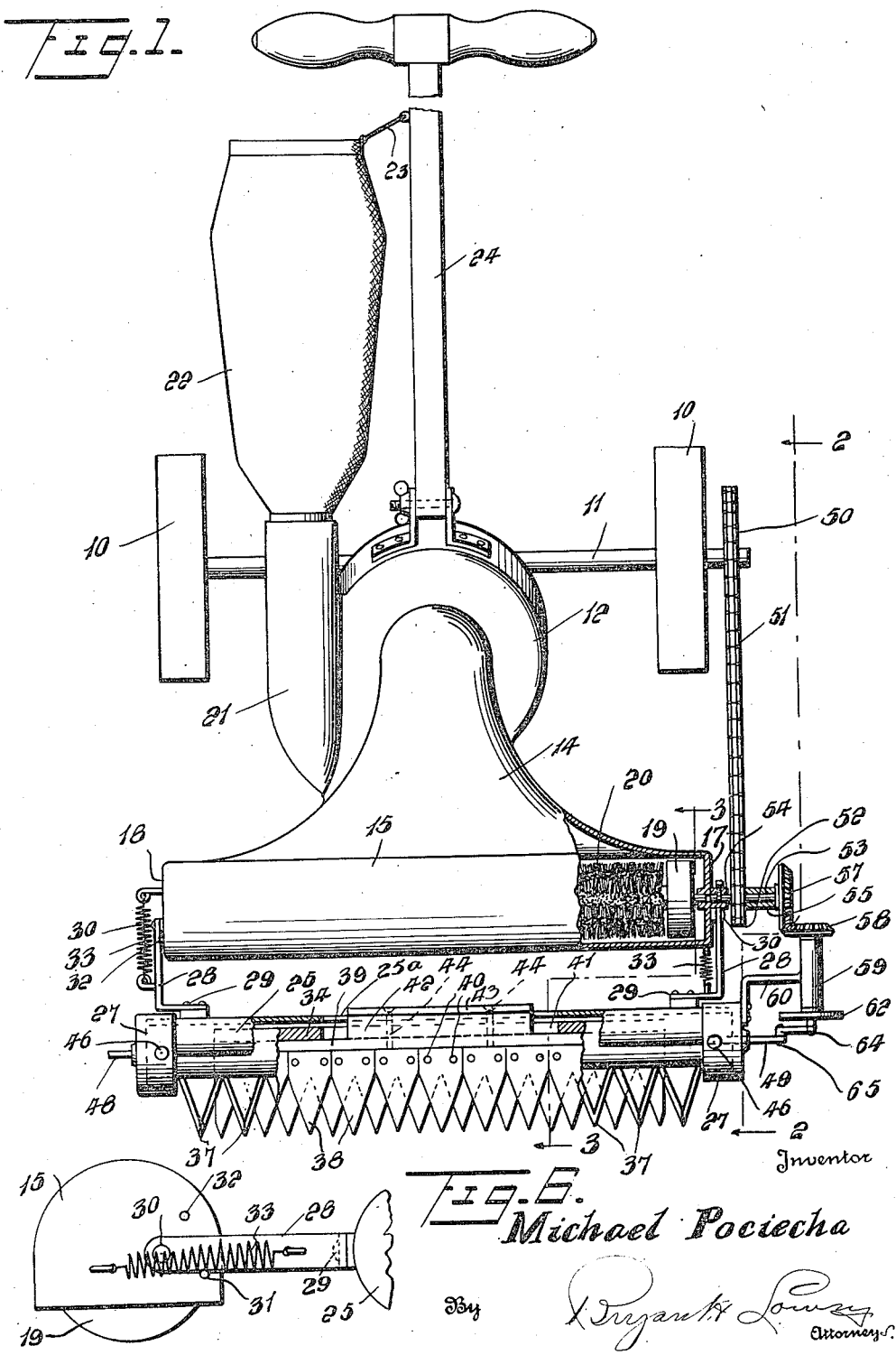

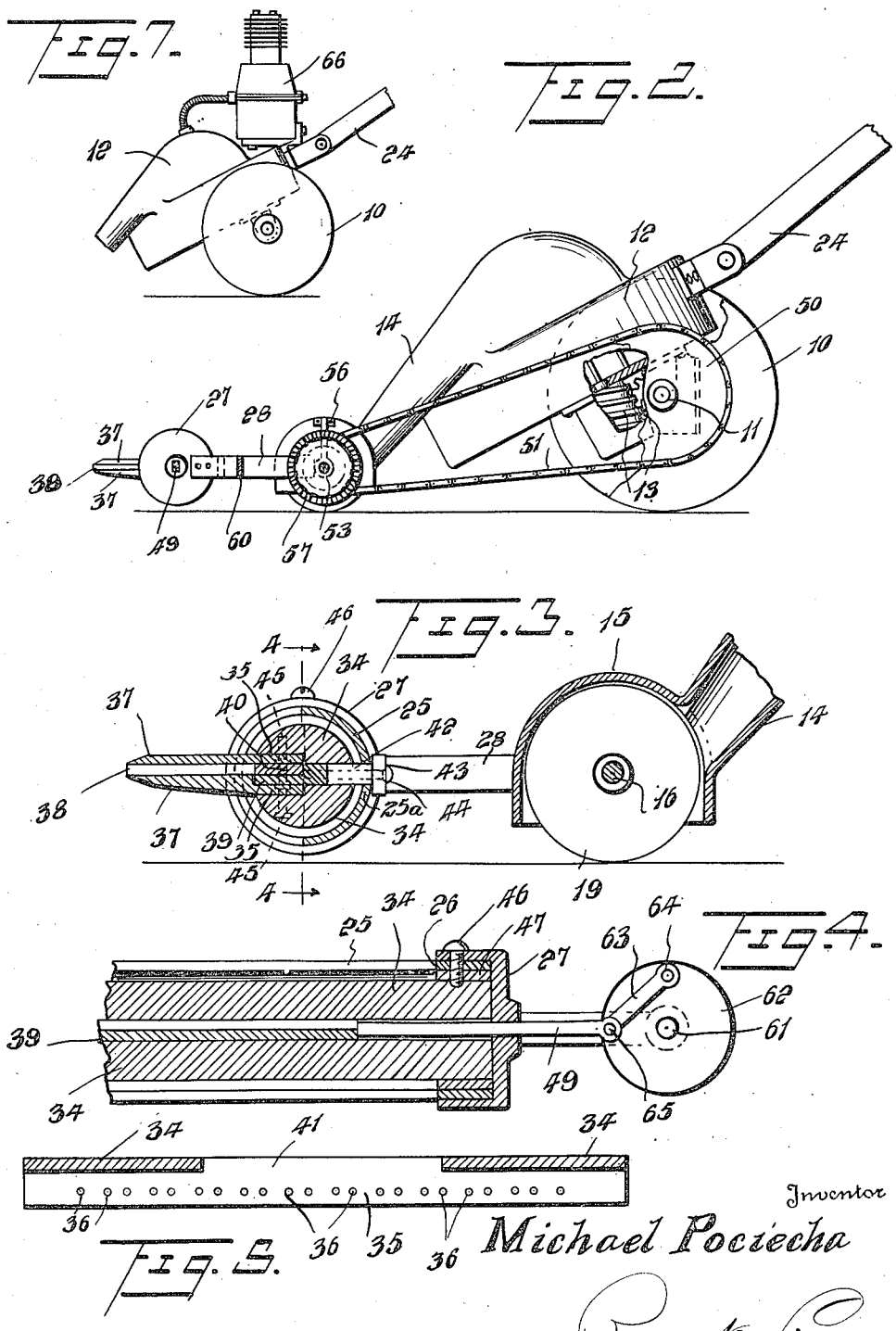

Patented Mar. 1, 1938

2,110,071

UNITED STATES PATENT OFFICE 2,110,071

LAWN MOWER

Michael Pociecha, East Berlin, Conn., assignor to Stella Szoplikowska and Helen Szoplikowska, both of East Berlin, Conn.

Application October 13, 1936, Serial No. 105,380

4 Claims. (Cl. 56—296)

This invention relates to certain new and useful improvements in lawn mowers.

The primary object of the invention is to provide a lawn mower equipped with suction producing apparatus for gathering the mowed grass or the like for collection in a bag or other receptacle, with the lawn remaining in a substantially clean condition after passage of the mower thereover.

A further object of the invention is to provide a lawn mower of the foregoing character wherein the grass cutting element comprises a reciprocating blade having a chain and gear connection with the ground wheels of the lawn mower for operation thereby.

A still further object of the invention is to provide a lawn mower with a forwardly positioned reciprocating cutter and a rotary brush rearwardly of the cutter for sweeping the mowed grass to suction producing means with the grass delivered to a collection receptacle.

With the above and other objects in view that will become apparent as the nature of the invention is better understood, the same consists in the novel form, combination and arrangement of parts hereinafter more fully described, shown in the accompanying drawings and claimed.

In the drawings:—

Figure 1 is a top plan view, partly broken away and shown in section of a lawn mower constructed in accordance with the present invention, showing the forwardly positioned reciprocating cutter, the rotary grass gathering brush rearwardly of the cutter and the suction producing means for directing the cut grass into a collection receptacle, together with the driving mechanism for the reciprocating cutter;

Figure 2 is a cross-sectional view taken on line 2—2 of Figure 1, with part of the suction producing casing broken away to illustrate a part of the interior mechanism;

Figure 3 is a detail sectional view taken on line 3—3 of Figure 1 showing the rotary brush housing and the mounting for the reciprocating cutter blades;

Figure 4 is a cross-sectional view taken on line 4—4 of Figure 3, showing the eccentric drive for the reciprocating cutter blades;

Figure 5 is a detail sectional view of a part of the split cylinder to which the stationary cutter blades are attached;

Figure 6 is a fragmentary side elevational view showing the pivotally mounted cutter member and the spring device associated therewith; and Figure 7 is a fragmentary side elevational view showing a motor drive for a lawn mower.

Referring more in detail to the accompanying drawings, the reference character 10 designates a pair of ground wheels that are fixed to opposite ends of an axle 11 that supports intermediate the ends thereof suction producing apparatus comprising a casing 12, the suction producing mechanism within the casing being of the usual type found in vacuum cleaners and like machines, a part of the mechanism being illustrated by the reference character 13 in Figure 2. A hollow chamber or casing 14 projects forwardly of the casing 12 that houses the suction producing apparatus and an elongated hood 15 open at its lower side is carried by the forward end of the air chamber 14.

The ground wheels 10 support the rear end of the lawn mower while the forward end thereof is supported by a pair of ground wheels carried by a shaft journalled in the end walls of the hood 15 with a rotary brush carried by the shaft within the hood for gathering cut grass and directing the same upwardly through the air chamber 14 into the casing 12 of the suction producing apparatus. As shown more clearly in Figures 1 and 3, a shaft 16 is journalled in the end walls 17 and 18 of the hood 15 and the shaft 16 adjacent each end thereof within the hood has ground wheels 19 fixed thereto with a brush 20 carried by the shaft 16 between the ground wheels 19. An outlet conduit 21 is carried by the casing 12 and has a grass collection receptacle 22 attached thereto, the same preferably being of the type employed in connection with vacuum cleaners and carrying a strap 23 at its outer end for attachment to the handle 24 of the lawn mower.

A grass cutting device is arranged forwardly of the hood 15 and as shown more clearly in Figs. 1 and 3 to 5, the same comprises an elongated semi-cylindrical holder 25 formed with a ring 26 at each end and further enclosed at each end by a cap 27. The support for the holder comprises a pair of angle brackets 28 anchored at their forward ends as at 29 respectively to each end of the holder 25 while the rear ends of the angle brackets 28 are pivoted as at 30 to the outer sides of the end walls 17 and 18 of the hood 15. Pivotal movements of the bracket 28 and the holder 25 on the hood 15 are limited by the abutments or stop pins 31 and 32 projecting outwardly of the end walls of the hood and coil springs 33 connecting the angle brackets 28 and hood 15 retain the angle brackets and holder in their adjusted positions. As illustrated in Figure 6, the angle bracket 28 is engaged with a stop pin 31 when the cutter carried by the holder 25 is in its lowered operative position with the line of pull of the spring 33 being below the pivotal point 30 of the angle bracket. The angle brackets and holder for the cutter are adapted to be elevated to inoperative positions and be limited by the upper stop pins 32, the coil springs 33 then moving above the bracket pivot 30 for retaining the parts in their elevated positions.

Stationary and reciprocating cutter blades are supported in the holder 25, a support for the cutter blades including a cylinder 34 that is longitudinally grooved at the forward side thereof to provide upper and lower seats 35 having a series of spaced openings 36 therein to accommodate the mounting of spaced stationary upper and lower cutter blades 37 of the shear type. The upper and lower shear blades 37 that are spaced from each other as shown in Figure 3 are vertically aligned in pairs and a reciprocating cutter having shear blades 38 is slidable between the upper and lower blades 37 as will be understood from an inspection of Figs. 1 and 3. The mounting for the reciprocating shear blades 38 includes a bar 39 reciprocable in recesses formed in the inner ends of the lower blades 37 as shown in Figure 3 with the inner ends of the reciprocating shear blades 38 anchored as at 40 to the bar 39. The rod 34 shown in Figure 5 is provided with a longitudinal slot 41 in the rear side thereof intermediate its ends into which projects an elongated block 42, said block also projecting through a slotted opening 25a in the rear side of the holder 25. A strip 43 of the same length as the block 42 is secured to the rear side of said block and is of a greater width than the diameter of the slot 25a in the holder 25, anchor screws 44 being employed for securing the strip 43 and block 42 to the bar 39. The upper and lower cutter blades 37 are anchored in position as shown in Figure 3 by the fastening devices 45. The end caps 27 on the holder 25 are anchored in position by screws 46 as shown in Figure 4 that extend through the rings 26 at the ends of the holder 25 and also through spacer rings 47 interposed between the ends of the holder 25 and the rod 34 with the inner ends of the screws engaged with the rod 34.

Stub shafts 48 and 49 carried respectively by opposite ends of the reciprocating bar 39 that carries the cutter blades 38 project through openings in the end caps 27 and means is associated with the stub shaft 49 to effect reciprocation of the cutter blades 38. As shown in Figures 1, 2, and 4, a sprocket wheel 50 is fixed to one end of the axle 11 outwardly of the adjacent ground wheel 10 and over which a sprocket chain 51 is trained, the sprocket chain also being engaged with a smaller sprocket wheel 52 carried by a shaft 53 that is journalled at one end in a bearing 54 on the adjacent end wall 17 of the hood 15 and further journalled in a sleeve 55 supported on the end wall 17 of the hood by means of the bracket 56 shown in Figure 2. A bevel gear 57 carried by the outer end of the shaft 53 meshes with a bevelled gear 58 carried by a shaft journalled in a tubular bearing 59 that is supported by a bracket 60 on the adjacent end cap 27 of the cutter bar mechanism. The shaft 61 that carries the bevel gear 58 projects through the forward end of the sleeve 59 as shown in Figures 1 and 4 and has a disk 62 fixed to the forward projecting end thereof. A link 63 is extensibly connected as at 64 at one of its ends to the disk 62 while the other end of the link 63 is pivotally connected as at 65 to the outer end of the stub shaft 49 carried by the reciprocating bar 43. When the lawn mower is moved over the ground, the ground wheels 10 operate the suction producing mechanism partly illustrated by the reference numeral 13 in Figure 2 and the roller brush 20 is rotated by the ground wheels 19. The sprocket chain and gear drive from the axle 11 to the stub shaft 49 effects rapid reciprocation of the cutter bar 43 and cutter blades 38 carried thereby, the latter moving between the upper and lower stationary cutter blades 37. The cut grass is gathered by the rotary brush 20 and directed into the air chamber 14 and further discharged by the suction producing apparatus in the casing 12 through the conduits 13 into the collection receptacle 22. The springs 33 shown in Figures 1 and 6 hold the angle bracket 28 and grass cutting blades in their lowered position for cutting operation and when the lawn mower is being transported, the cutter mechanism may be elevated and limited by the stop pin 32 and so retained by the springs 33.

The ground wheels 10 effect operation of the suction producing mechanism and the reciprocating cutter while the showing of the invention in Figure 7 provides for a motor 66 supported on the casing 12 that houses the suction producing mechanism and said motor may be employed for operating the suction producing mechanism, and ground wheels 10.

From the above detailed description of the invention, it is believed that the construction and operation thereof will at once be apparent and while there are herein shown and described the preferred embodiments of the invention, it is nevertheless to be understood that minor changes may be made therein without departing from the spirit and scope of the invention as claimed.

I claim:—

1. In a lawn mower of the character described, an axle having ground wheels fixed thereto, a frame structure supported on the axle, a cutter member holder having an arm at each end thereof, pivotally supported on the ends of the frame structure, a reciprocating cutter member mounted in the holder and including upper and lower stationary cutter blades and intermediate reciprocating blades, substantially horizontal springs attached to the ends of the frame structure and arms respectively rearwardly and forwardly of the pivotal mounting of the arms for selectively holding the cutter member in lowered operative position and elevated inoperative position, and means carried by the frame structure and cooperating with said arms for limiting pivotal movement of the cutter member holder.

2. In a lawn mower of the character described, an axle having ground wheels fixed thereto, a frame structure supported on the axle, a cutter member holder having an arm at each end thereof pivotally supported on the ends of the frame structure, a reciprocating cutter member mounted on the holder and operatively connected with the axle, the cutter member including upper and lower stationary cutter blades and intermediate reciprocating blades, substantially horizontal springs attached to the ends of the frame structure and arms respectively rearwardly and forwardly of the pivotal mounting of the arms for selectively holding the cutter member in lowered operative position and elevated inoperative position and means carried by the frame structure and cooperating with said arms for limiting pivotal movement of the cutter member holder.

3. In a lawn mower of the character described, an axle having ground wheels fixed thereto, a frame structure supported on the axle, a cutter member holder having an arm at each end thereof pivotally supported on the ends of the frame structure, a reciprocating cutter member mounted in the holder and operatively connected with the axle, the cutter member including upper and lower stationary cutter blades and intermediate reciprocating blades, the operative connection between the cutter member and axle including a combined chain and sprocket mechanism and a gear train, substantially horizontal springs attached to the ends of the frame structure and arms respectively rearwardly and forwardly of the pivotal mounting of the arms for selectively holding the cutter member in lowered operative position and elevated inoperative position and means carried by the frame structure and cooperating with said arms for limiting pivotal movement of the cutter member holder.

4. In a lawn mower of the character described, an axle having ground wheels fixed thereto, a frame structure supported on the axle, a cutter member holder having an arm at each end thereof pivotally supported on the ends of the frame structure, a cutter member mounted in the holder and including a longitudinally grooved shaft, anchored in the holder, vertically alined pairs of spaced stationary cutter blades secured in the shaft groove and projecting forwardly of the shaft, a reciprocating bar slidably mounted between the stationary blades, cutter blades secured to the bar intermediate the stationary blades for cooperation with the stationary blades and operative connections between the slide bar and axle.

MICHAEL POCIECHA.